J. W. TRAFTON.
Faucets.
No. 129,872.  Patented July 23, 1872.
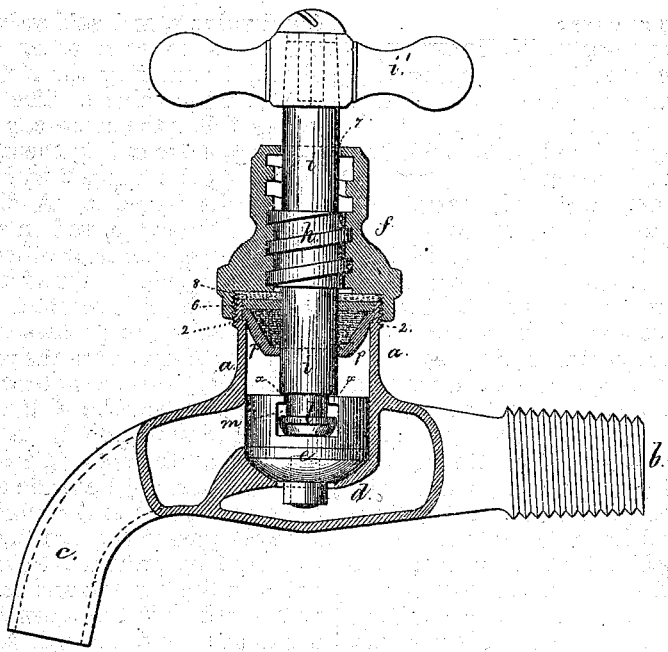
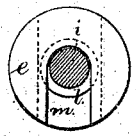

UNITED STATES PATENT OFFICE.

JOHN W. TRAFTON, OF SPRINGFIELD, MASSACHUSETTS.

IMPROVEMENT IN FAUCETS.

Specification forming part of Letters Patent No. 129,872, dated July 23, 1872.

*To all whom it may concern:*

Be it known that I, JOHN W. TRAFTON, of Springfield, in the county of Hampden and State of Massachusetts, have invented and made an Improvement in Faucets; and the following is hereby declared to be a full and correct description of the same.

In faucets where a screw-spindle is employed to move the valve said screw is exposed to the water, and is liable to obstruction and injury from sand or other foreign substances passing with the water through the faucet. This is particularly the case with river water containing considerable earthy matter, and the screw cannot be properly lubricated because the lubricant is washed away by the water, and washers have to be applied at the opening in the screw-cap through which the spindle passes to prevent leakage at this point. The object of my invention is to overcome these difficulties; and said improvements consist of a gland or stuffing-box for the screw-spindle to pass through, placed between the valve and the screw on said spindle, so as to prevent the water passing to the screw. By this construction the screw is not exposed to the water, and hence can be properly lubricated, and all risk of injury or obstruction to the screw by sand or other foreign substances is avoided.

In the drawing, Figure 1 is a vertical section of the faucet with the screw-spindle and valve in elevation, and Fig. 2 is a section at the line $x$ $x$.

The barrel $a$ of the faucet, screw-end $b$, bib or delivery-end $c$, and seat $d$ for the valve $e$ are all of usual character. $f$ is the screw-cap for the upper end of the barrel $a$, and the same is made with the female screw-thread for the screw $h$ upon the spindle $i$. Said spindle is revolved by the handle $i'$ to open or shut off the passage of water through the opening in the seat $d$ by raising or lowering the spindle $i$ and valve $e$, and said valve and spindle are connected to each other by the neck and shoulder $l$ entering the slotted flanged opening $m$ in the valve $e$. The gland or stuffing-box is below the screw-cap $f$, and is made as a cup, $p$, surrounding the spindle, and is supported by the flange 2 within a recess in the top of the barrel $a$. A disk, 6, serves as a cover to the cup $p$, and in said cup is a packing of cotton-waste or other elastic material, preferably wound around the spindle $i$, and when the cap $f$ is screwed to place upon the barrel $a$ said cap presses the cover 6 to the cup $p$ and compresses the packing in said cup so that a perfectly water-tight joint is made around the spindle $i$ that prevents water passing to the screw $h$. A washer not being required at the opening 7 in the screw-cap $f$, this opening may be made a little larger than the spindle, so that the lubricant for the screw $h$ may be passed through the same. A washer, 8, should be provided to make a tight joint between the barrel $a$ and screw-cap $f$. It will be evident that the screw $h$ has a large bearing in the cap $f$, and will not wear as quickly as in most other cocks of this class; neither does the nut partly separate from the screw, as has often before been the case.

I claim as my invention—

The screw $h$ upon the spindle $i$, acting within the screw-cap $f$, in combination with the cup $p$, packing and disk 6 around the smooth portion of the stem $i$ and between the valve and screw, as and for the purposes set forth.

Signed by me this 6th day of January, A. D. 1872.

JOHN W. TRAFTON.

Witnesses:
CHAS. H. SMITH,
GEO. T. PINCKNEY.